Oct. 31, 1933.   W. B. FAGEOL   1,932,400
UNIVERSAL JOINT
Filed Nov. 7, 1929
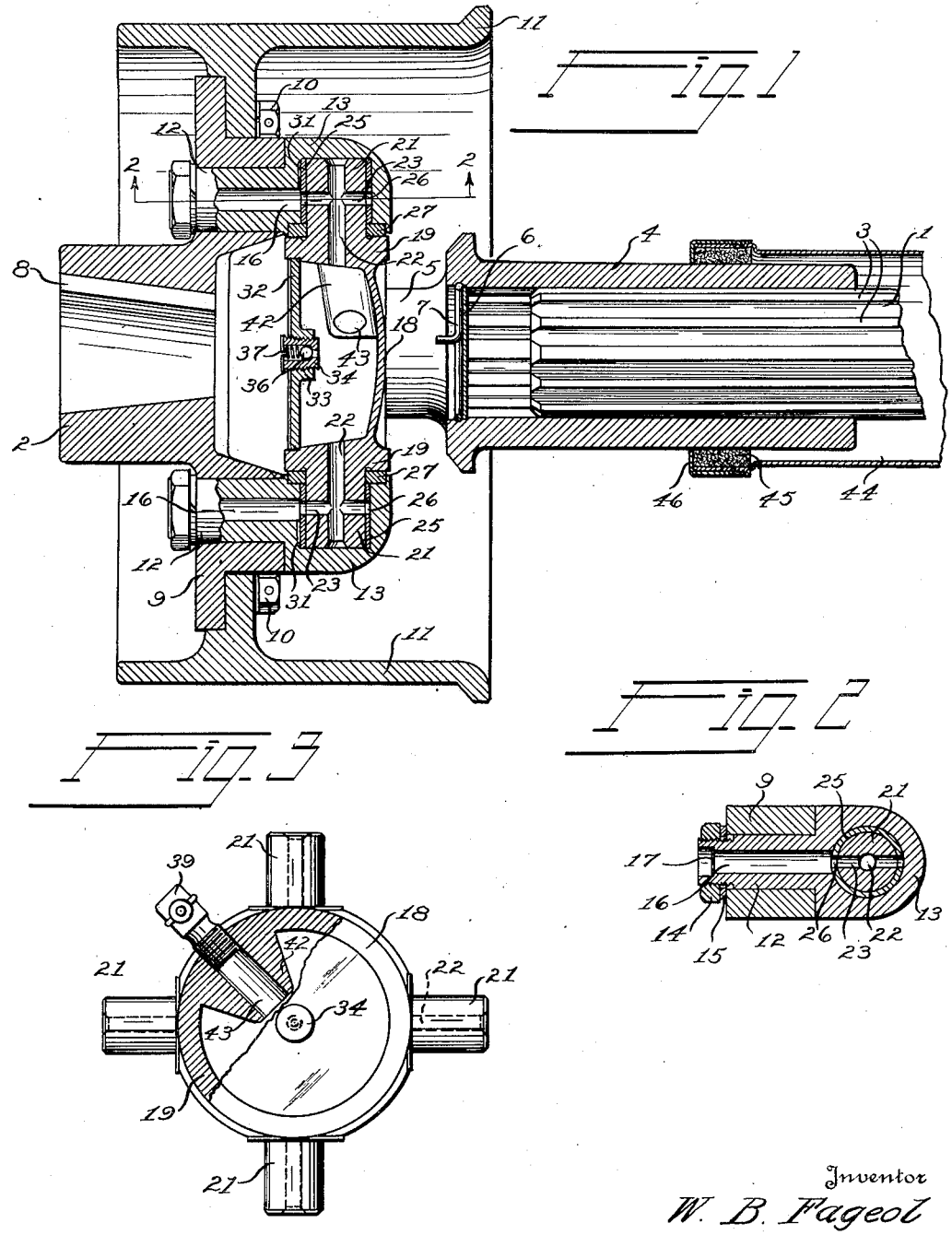
Inventor
W. B. Fageol
By Strauch & Hoffman
Attorneys Patented Oct. 31, 1933

1,932,400

UNITED STATES PATENT OFFICE 1,932,400

UNIVERSAL JOINT

William B. Fageol, Kent, Ohio, assignor to Twin Coach Company, Kent, Ohio, a corporation of Delaware Application November 7, 1929. Serial No. 405,490

5 Claims. (Cl. 64—102)

This invention relates to a universal joint and more especially to a universal joint for use in the drive shaft for a vehicle such as a rail car, automobile bus or coach, although obviously the invention is not limited thereto.

Prior universal joints have been constructed to provide a central cross member having diametrically opposed pins extending therefrom with bushings surrounding said pins. These pins have sometimes been made of steel with Babbitt metal or bronze used in the bushings surrounding the pins. This arrangement requires proper lubrication at all times. Usually the universal joint for a vehicle is arranged in an inaccessible position, and for this reason lubrication of the joint is quite frequently neglected. Although the makers of vehicles such as busses and coaches give instructions to periodically and regularly lubricate the universal joint, nevertheless operators become quite careless and fail to lubricate these joints, with the result that they become heated and wear out rather quickly.

It has also been found that although the universal joints may be lubricated periodically and properly, nevertheless the lubricant is lost during use of the joint under the action of centrifugal force or for various causes. For this reason it is not unusual for the universal joint to run dry even if given proper attention, and to be seriously damaged by the resultant wear when the lubricant has been lost. The universal joint disclosed in this application is capable of use under the severest conditions of service and while it is designed so that it may be properly lubricated, and the oiling mechanisms associated therewith are so arranged that the lubricant placed therein shall not be lost, the joint is capable of standing indefinite abuse because of absence of the proper lubricant.

Applicant has discovered that contrary to the usual practice, a universal joint wherein the pins are made of extremely hard sheet and the bushings surrounding the pins are also made of very hard steel, that the joints will stand up under abuse and lack of lubrication much longer than the usual type of construction, and, in fact, operate indefinitely.

One object of this invention, therefore, is to provide a universal joint for general use in which the parts thereof, which are in frictional contact are each of extreme hardness rather than of different degrees of hardness, or relatively soft, as heretofore thought necessary. More specifically, it is an object of this invention to provide a universal joint of the type including a cross member with bushings surrounding the pins of said cross, the pins being of an extremely hard steel, and the bushings being of even harder steel.

It is a further object of this invention therefore to provide a universal joint which has a novel means for placing oil therein and novel means for allowing the escape of used oil therefrom when fresh oil is inserted. More specifically, it is an object of this invention to provide such oiling mechanisms that the oil will not be lost by centrifugal force during use of the universal joint.

It is a further object of this invention to provide a universal joint wherein the cross member is made with a permanently installed end plate thereon, oil passages are provided through the pins and bushings for efficient lubrication of the members subjected to wear, and the general efficiency and usefulness of the joint is greatly increased. These and other objects will be apparent from the following description when taken in connection with the accompanying drawing wherein—

Figure 1 is a section taken through one form of my joint,

Figure 2 is a section taken substantially on line 2—2 of Figure 1, and

Figure 3 is a front elevation of a slightly modified form of cross showing the means for lubricating the joint.

Referring to the drawing, wherein like reference characters refer to like parts, there is shown a shaft 1 adapted to be connected with a hub 2 for driving relation between the parts. The shaft 1 has splines 3 cut in outer surface thereof for engagement with corresponding splines of a hollow member 4, having a U-shaped end 5. The open end of the member 4 is closed by a detachable plate held in position by a snap ring 7 engageable in grooves in the member 4.

The U-shaped portion 5 of the member 4 is provided with suitable sockets engageable over two opposite pins of a cross member hereinafter referred to. Said sockets may be similar to the sockets secured to the hub member 2 or may assume any other convenient form. Those in connection with hub member 2 will be hereafter described in detail.

The hub 2 has a key way 8 therein for the securing of a shaft to said hub, which shaft is not shown. The hub has further, preferably, integrally formed therewith an outstanding flange 9 to which flange is secured, by bolts 10, a circular brake drum 11. The flange 9 has two diametrically opposed holes 12 therein for the reception of caps 13, which caps are adapted to be positioned over two opposite pins on a central cross member before referred to.

As seen more fully in Figure 2, the ends of the caps 13 project beyond the outstanding flange 9, and are threaded to receive nuts 14 thereon for clamping caps 13 to the flange 9, washers 15 being interposed between the nuts 14 and said flanges. The portion of each cap 13 which projects through the flange 9 has a cylindrical opening or bore 16 therethrough, a cap or plate 17 closing the outer end of the cylindrical opening.

The cross member which connects the shaft 1 and the hub 2 is constructed as follows. The main body portion of the cross 18 is hollowed out, as seen clearly in Figure 1, and from the peripheral portion 19 of the cross 18, four diametrically opposed circular pins 21 project. In the preferred form as shown in Figure 1, each pin is longitudinally drilled as at 22, the channel thus formed extending from the interior hollow portion of the cross to the end of each pin. A cross drilling may provide a cross channel 23 in each pin connecting channel 22 with the outer circumference of each pin about midway of the length thereof. Each cap 13 is provided with a socket for a pin on the cross member.

Interposed between each pin and its corresponding opening in socket member or cap 13 there is positioned a bushing 25, which bushing may be correspondingly cross drilled to provide openings 26 communicating with the cross channel 23 of the pin. The openings 26 in the bushings 25 align with the bore or passage 16 in the arm of each cap 13. A suitable gasket 27 is interposed between the lower stem of each bushing and the base portion of flange 19 of the cross 18. In each cap 13 a small channel 31 extends outwardly from the cylindrical channel 16 to assist in lubrication of the joint.

The hollow cross 18 has permanently fixed to one face thereof a circular plate 32 which plate is permanently secured in position as by welding or otherwise. Plate 32 has a centrally disposed boss 33 with an opening therethrough for the reception of an oil relief valve 34. Valve 34 is longitudinally drilled and has a seat therein for the reception of a ball valve 36 normally pressed inwardly by spring 37. Lubricant such as heavy oil or light grease is supplied to the interior of the boss by a grease connection 39, shown in Figure 3. These grease connections are usually provided with an outward receding ball valve to prevent the escape of grease after the same has been inserted, but it has been found that in practice sometimes the ball valve does not seat properly or becomes damaged and grease may escape from the parts to be lubricated. The loss of grease as above described is particularly noticeable in a rotating member wherein the greasing connection is placed near the periphery of the rotating member and is therefore subjected to centrifugal force, the grease tending to be forced out of the greasing connection unless the valve is very firmly seated on its seat.

In order to overcome the above difficulties applicant has provided an integrally formed inwardly extending portion 42 of the cross 18 in order that the grease may be forced to the center of the cross, and centrifugal force tending to throw the grease out of the cross through the connection will be practically negligible. The portion 42 has a channel 43 therein extending approximately to the center of the cross and communicating at its outer end with the greasing connection 39.

As above constructed the lubrication of the universal joint is as follows: Lubricant may be forced through the lubricating opening 39 into the center of the hollow cross member 18 and the entrained air and old and worn out grease is thereby forced outwardly through the automatically opening oil relief valve 36. By the provision of an oil relief valve the cross member is not subjected to extreme internal pressures such as may be attained by the booster type of grease gun in use. Since the oil relief valve is placed exactly centrally of the cross member, it is not subjected to centrifugal force during operation of the joint, and therefore grease is never lost through the relief valve by centrifugal force. Since the entrance channel for the grease 43 extends also approximately to the center of the cross there is no centrifugal force tending to throw grease out of this channel as above stated, and therefore exact seating of the inwardly opening valve in the connection 39 is not absolutely essential. In normal use of the joint grease is forced outwardly through the channels 22 of the pin 21 and said grease passes through the cross channels 23 to thereby lubricate the bushing 25. The channel 16 of the cap 13 forms a substantial grease pocket or reservoir for the reception of grease or oil, the plates 17 preventing loss of grease out of these channels. Grooves 31 assist in the lubrication of the bushing 25 at the end of the pin 21, since lubricant in the channel or reservoir 16 may move outwardly by centrifugal force in channel 31. Gaskets 27 prevent loss of grease around the base of the bushings and the pins.

In order to prevent loss of lubricant usually supplied to the splined shafts 1 and 4, a sleeve 44 is provided having packing 45 at one end and held in position by an end cap 46.

In the modification shown in Figure 3, the pins 21 of the cross do not have the cross drilling or channels 23 therein, the lubrication of the joint being accomplished by the movement of the grease outwardly through the central channels 22 and around the ends of the pins and bushings.

Although the joint as above constructed embodies many novel features, nevertheless the most important characteristic of the joint in this application is due to the nature of the material used to make up the joint. The materials as hereinafter described may be embodied in various other structural types of joints than that shown in the drawing, that type that has been just described being preferred at present.

It has been common practice in the past to provide a universal joint, wherein the pins of the cross member are made of fairly hard steel, and the bushings surrounding the pins, are made of Babbitt metal or bronze or some other relatively soft metal. Past experience has led to the prevalent belief that, if the pins and the bushings are both made of relatively hard steel or other hard metal, they would weld together, or be otherwise destroyed, if the bearings ran dry for even a short time. Applicant has discovered that this is true only if ordinarily hard materials are used and that a universal joint made up with the pins of extremely hard steel and the bushings made also of very hard steel, but preferably not as hard as the pins, that excellent wearing qualities can be obtained, and the parts of the joint will not weld together or be injured, when subjected to extreme wear without proper lubrication. The joints of this application can be subjected to extraordinary abuse without injury thereto.

To accomplish these results applicant found that it is necessary that the surface hardness of the steel in the pins and the bushings be of a much higher order than that formerly used in either these members, and in fact, of a much higher order than steel used for ordinary purposes.

It is understood that a serious fault in the use of steels of extreme hardness is the fact that such steels are extremely brittle and therefore not able to stand up under the strains to which they are subjected. Applicant accordingly uses steels having the requisite strength, the surface only of which is hardened to an unusual degree while the core thereof can retain its strength to withstand the strains put upon the material. Steels of this character have been before proposed for other purposes, but so far as applicant is aware were not thought applicable to bearings between accurately fitting relatively rotatable elements having relatively large surface areas in close frictional contact under relatively heavy loads.

In the joint, as actually built by applicant the cross member 18 is made of good quality chromium and manganese steel and the external surface of the pin is thereafter subjected to a hardening process, such that it approaches a hardness of the magnitude of 1000, as measured by the Brinnell test. The bushings surrounding these pins are made of a steel which is also subjected to surface hardening to acquire a hardness of approximately 500 Brinnell. Joints made in accordance with these specifications have been tried out and found to be extremely durable in use, showing practically no signs of wear after long periods of use when subjected to extreme conditions of service and even when operated without lubricant.

Any surface hardened steel whose surface approaches the hardness of the range given above, namely 1000 Brinnell for the pins, and 500 Brinnell for the bushings, or vice versa may be used. In applicant's tests it has been found that a steel which is marketed under the trade name "Nitralloy" serves this purpose admirably. This "Nitralloy" steel is a surface hardened steel, made under the processes described in United States Patents 1,487,554 and 1,649,398. Such steel is suitable for applicant's purpose, though other surface hardened steel may be used. Since the cores of the pins of the cross are made of steel, which do not have the extreme hardness of the surface thereof, the requisite strength is imparted to the pins. The hard surfaces that are in contact stand up, it is believed, because the coefficient of friction is relatively low, so that when the joint is operated without adequate lubrication insufficient heat is developed to destroy the joint, or to seriously affect the very hard surfaces.

Although excellent results have been obtained with the surface hardened steel made in accordance with the Nitralloy process, it will be understood that this invention is not limited to that specific form of steel, since any other surface hardened steel may be used in which the hardness thereof approaches the degree of hardness as given above.

Although the universal joint has been described as having surface hardened steel of the order of 1000 Brinnell and 500 Brinnell, it will be understood that these degrees of hardness may be varied somewhat, since the above figures illustrate only that degree of hardness considered at present to be the best. Surfaces hardened to the order of 300 to 600 Brinnell for one member and 700 to 1200 for the other member are satisfactory and may be considered to fall within the scope of this invention, as defined by the term extreme hardness in the accompanying claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. A universal joint comprising a unitary cross member having an outer peripheral wall and integral trunnions projecting therefrom, said member having a central lubricating chamber, a cover closing one side of said chamber, said trunnions having passageways therein communicating with said chamber whereby lubricant is fed outwardly through said passageways under the action of centrifugal force, a lug formed on the peripheral wall of said member and projecting into said chamber to substantially the center thereof, said lug having a passageway therethrough through which lubricant may be inserted into said chamber, and a substantially centrally positioned one-way valve communicating with said chamber, whereby air and old lubricant may be forced out of the chamber when new lubricant is forced thereinto and lubricant is not lost due to centrifugal action.

2. The invention as defined in claim 1 wherein a lubricant fitting is secured into the outer end of said passageway through said lug.

3. The invention as defined in claim 1 wherein said one-way valve is mounted on said cover.

4. A universal joint comprising trunnion supporting means provided with a lubricant chamber; bearing means cooperating with said trunnion supporting means; lubricating passages in said trunnion supporting means communicating with said lubricant chamber and said bearing means; a lubricant feeding passage communicating with said chamber centrally thereof; means associated with said passage for permitting lubricant to be fed thereto; and a vent passage communicating with said lubricant chamber centrally thereof, whereby loss of lubricant through said passages from said chamber by the action of centrifugal force is avoided.

5. A universal joint comprising trunnion supporting means provided with a lubricant chamber; bearing supporting means cooperating with said trunnion supporting means; means for enabling lubricant to be supplied to said chamber under substantial pressure; and pressure relief means for avoiding destructive pressures within said chamber, both said last-mentioned means opening into said chamber adjacent the axis of rotation of said trunnion supporting means to avoid loss of lubricant from said chamber by the action of centrifugal force.

WILLIAM B. FAGEOL.